US012779921B2

(12) United States Patent
Yhr

(10) Patent No.: US 12,779,921 B2
(45) Date of Patent: Nov. 3, 2026

(54) SYSTEM FOR PROVIDING COMMUNICATION BETWEEN A TOWING VEHICLE AND A TOWED VEHICLE, AND A METHOD THEREOF

(71) Applicant: Volvo Truck Corporation, Gothenburg (SE)

(72) Inventor: Hamid Yhr, Gråbo (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 152 days.

(21) Appl. No.: 18/487,447

(22) Filed: Oct. 16, 2023

(65) Prior Publication Data

US 2024/0131888 A1 Apr. 25, 2024
US 2024/0227478 A9 Jul. 11, 2024

(30) Foreign Application Priority Data

Oct. 19, 2022 (EP) ..................................... 22202541

(51) Int. Cl.
*B60D 1/64* (2006.01)
*G07C 5/08* (2006.01)

(52) U.S. Cl.
CPC ............. *B60D 1/64* (2013.01); *G07C 5/0816* (2013.01)

(58) Field of Classification Search
CPC ................................ B60D 1/64; G07C 5/0816
See application file for complete search history.

(56) References Cited

U.S. PATENT DOCUMENTS

2015/0321666 A1* 11/2015 Talty ..................... B60W 30/00 701/41
2016/0023587 A1* 1/2016 Bean ...................... B60Q 1/305 340/431
2017/0088104 A1* 3/2017 Risse ......................... B60T 7/20
2018/0375272 A1* 12/2018 Scheim ................ H01R 31/065
2019/0364406 A1* 11/2019 Lotz ..................... B62D 35/001
2021/0072364 A1* 3/2021 Weinlich ................. G01S 11/06
2022/0126637 A1* 4/2022 Kahlbaum ......... H01R 13/6658

FOREIGN PATENT DOCUMENTS

EP 3934290 A1 1/2022
EP 3993457 A1 5/2022

OTHER PUBLICATIONS

Extended European Search Report, European Application No. 22202541.3, mailed Mar. 7, 2023, 9 pages.

* cited by examiner

*Primary Examiner* — Abdulmajeed Aziz
(74) *Attorney, Agent, or Firm* — Sage Patent Group

(57) ABSTRACT

A system for providing communication between a towing vehicle and a towed vehicle is provided. The system comprises a first communication device configured to be arranged in a rear end of the towing vehicle, and a second communication device configured to be arranged in a front end of the towed vehicle. The towing vehicle is provided with a first power transmission device arranged to be physically connected to a second power transmission device provided in the towed vehicle. The first and second communication devices are arranged on the first and second power transmission devices, respectively, such that in a power transmission connected state (PCS) the first and second communication devices are placed at a power transmission connected state distance (PCSD) from each other, wherein the power transmission connected state distance (PCSD) is less than a wireless communication range (COM-RAN).

14 Claims, 3 Drawing Sheets

SYSTEM FOR PROVIDING COMMUNICATION BETWEEN A TOWING VEHICLE AND A TOWED VEHICLE, AND A METHOD THEREOF

CROSS REFERENCE TO RELATED APPLICATIONS

This application claims priority to European Patent Application No. 22202541.3, filed on 19 Oct. 2022, the disclosure and content of which is incorporated by reference herein in its entirety.

TECHNICAL FIELD

The disclosure relates generally to vehicle communication. In particular aspects, the disclosure relates to a system for communicating between a towing vehicle and a towed vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

Today, it is known that a truck towing a trailer is connected to the trailer such that power can be transmitted, but also such that control data can be sent from the truck to the trailer. By way of example, the power transmitted from the truck to the trailer can be used for powering lights on the trailer, and the control data can be used for controlling e.g. brake lights on the trailer. A well-known standard within the automotive industry for exchanging control data is the so-called Controller Area Network (CAN).

Even though communication systems for transmitting power and control data from the truck to the trailer serve their purpose in many situations, the systems used today are in some aspects constituting a limitation. For instance, in case the trailer is provided with cameras for capturing image data depicting surroundings of the trailer, the communication systems of today are often not providing the bandwidth needed for transmitting the image data from the trailer to the truck. One way of solving this is by including an additional communication system for handling the image data.

The additional communication system for handling the image data to be transmitted from the trailer to the truck can be a wireless communication system. One advantage of having wireless communication is that less time is needed for installing the cameras. The downside is however that the wireless communication could be disrupted by other devices, willful or by accident. For instance, a person or organization could disrupt the wireless communication by sending jamming signals close to the trailer and truck. Another risk with wireless communication is the risk that there are unsolicited connections made to the truck or trailer via the wireless communication arrangement. For instance, in case such unsolicited connection is made, there is a risk that malicious software is uploaded, which in turn could pose a security risk. By way of example, the malicious software could be made to control brakes or steering, which could have severe consequences.

Based on the above, by including wireless communication arrangements for handling data transfer between the trailer and truck, it is made possible to transfer large amounts of data between the truck and trailer. However, as pointed out above, an effect using such a wireless communication arrangement is that there could be a safety risk if no appropriate measures are made.

SUMMARY

According to a first aspect of the disclosure it is provided a system for providing communication between a towing vehicle and a towed vehicle. The system may comprise a first communication device configured to be arranged in a rear end of the towing vehicle and connected to a towing vehicle control unit. The first communication device may comprise a first transceiver for communicating with a second transceiver of a second communication device. The second communication device may be configured to be arranged in a front end of the towed vehicle and connected to a towed vehicle control unit. The second communication device may comprise the second transceiver for communicating with the first transceiver of the first communication device. The towing vehicle may be provided with a first power transmission device arranged to be physically connected to a second power transmission device provided in the towed vehicle. The first and second communication devices may be physically connected to the first and second power transmission devices, respectively, such that in a power transmission connected state the first and the second communication devices can be placed at a power transmitted connected state distance from each other, wherein the power transmission connected state distance is less than a wireless communication range of the first and second communication devices. This first aspect may seek to solve the problem of reducing the risk that the communication between the towing vehicle and the towed vehicle is disrupted by e.g. a jamming device, and also that a risk of having malicious software uploaded to the towing vehicle or the towed vehicle. A technical benefit may include that the communication devices are physically linked to the power transmission devices. This has the effect that once the power transmission devices are physically connected to each other, i.e. the system is in the power connection state, a distance between the communication devices is known. This distance can be held short, e.g. less than 1 cm. By having this short distance, the communication devices can be arranged to operate with a communication range just above this distance. Such short-range communication may come with several advantages. For instance, the risk of disruption caused by external jamming devices is reduced. In addition, the risk of having malicious software uploaded can be reduced. Further, less power may be needed compared to communication solutions having communication ranges of e.g. 10 meters. Having the first and second communication devices physically connected to the first and second power transmission devices, respectively, may imply that one and the same device can be used for power transmission and communication for the towing vehicle, and one and the same device can be used for power transmission and communication for the towed vehicle, which in itself is an advantage since this reduces a risk of handling errors.

In some examples, the wireless communication range may be less than 1 cm in open air. In case a signal guiding element is used, i.e. not open air, the communication devices may be placed more than 1 cm from each other, but still have a communication range of less than 1 cm in open air. The signal guiding element may be construed as a waveguide. A waveguide may reduce signal loss associated with the propagation of electromagnetic waves. Less power may therefore be needed for the communication between the communication devices.

In some examples, the first power transmission device may form part of a first general transmission device, and the second power transmission device may form part of a second general transmission device, wherein the first general transmission device may further comprise first physical connectors, and the second general transmission device may further comprise second physical connectors such that control data can be transmitted via wired communication from the towing vehicle control unit to the towed vehicle control unit. A technical benefit with having physical connectors, e.g. pins, is that data may be sent both via wire and wireless. Having both these options provide for improved redundancy. For instance, in case the wireless communication is interrupted, key information by default transmitted via the wireless communication can be transmitted via the wired communication, i.e. the physical connectors. By way of example, in case the wireless communication is down, information whether or not cameras placed in the towed vehicle is activated or not may be transmitted via the wired connectors.

In some examples, the control data may pertain to towed vehicle brakes, towed vehicle lights and/or CAN data. A technical benefit of sending this type of data via the wired communication is that the risk of data tampering, i.e. someone modifying the data when this is transmitted from the towing vehicle to the towed vehicle, can be reduced.

In some examples, the control data may be transmitted via the wireless communication as well as the wired communication. This may have the benefit that the risk that the data has been tampered with can be even further reduced. As an alternative to transmit the same data via both the wired and wireless communication is to transmit control bits via one of them and full data via the other. With the control bits, or control bytes if a number of bits is not deemed sufficient, at hand, these can be used for assuring that the data has not been tampered with.

In some examples, the first power transmission device may be formed as a plug socket, herein also referred to as a socket, and the second power transmission device may be formed as a plug. A technical benefit of having a plug and socket combination is that the distance between the communication devices can be set in a precise manner. Today, the plug and socket combination is used for assuring that the power transmission devices are securely fastened to each other, which is relevant since this assures reliable power transmission. However, by having the communication devices physically connected, directly or indirectly, sometimes also referred to as physically attached or fixedly attached, to the power transmission devices, plug and socket combinations made to assure reliable power transmission can also be used for assuring secure wireless data communication. Another option is to have the first power transmission device formed as the plug and the second power transmission device formed as the plug socket. Further, it is also possible to have the first power transmission device and the first communication device integrated into a first general transmission device where the first general transmission device may be formed as a plug or plug socket, and to have the second power transmission device and the second communication device integrated into a second general transmission device, where the second transmission device is formed as an interrelated plug socket or plug. The plug is to be understood to be a piece inserted into the plug socket. However, the plug may include both pins and receiving slots and complementary plug socket may comprise both pins and receiving slots. Both the plug and the plug socket may have at least one of the receiving slots protected by sleeve-shaped portions surrounding the receiving slots. The first communication device may be placed inside such sleeve-shaped portion in the plug or in the plug socket, and a corresponding pin in the plug socket or plug may be removed to avoid damaging the first communication device. In a similar manner, the second communication device may be placed inside such sleeve-shaped portion in the corresponding plug socket or plug, and a corresponding pin may be removed to avoid damaging the second communication device. By using this approach, an existing plug and plug socket arrangement can be modified such that the first and second communication device are placed, in the plugged in state, at a well-defined distance from each other, herein referred to as the power connected state distance, and that this distance is less than the communication range.

In some examples, the first and second communication device may be encapsulated in plastic molds. A technical benefit of this is that a risk that dirt, water, etc. comes into one of the communication devices can be reduced.

In some examples, the plastic mods of the first and second power transmission devices may be arranged such that, in a plugged in state, dirt is prevented from reaching the first and second communication devices, respectively. A first housing may cover the first power transmission device and the first communication device, and a second housing may cover the second power transmission device and the second communication device. The first and second housing may be arranged such that dirt is prevented from reaching the first and second communication device in the power transmission connected state. In this way, as an alternative to having the first and second molds, the first and second housing may be used for reducing the risk of having dirt reaching the first and second communication devices. Further, if using the first and second housing in combination with the first and second plastic molds, the risk of having dirt or any other unwanted particles reaching the first and second communication devices can be even further reduced. In addition to preventing dirt to reach the first and second communication devices, the first and second plastic molds may be used for physically protecting the first and second communication devices, e.g. reducing the risk of having the devices physically damaged in rough road conditions.

In some examples, wherein a data communication failure indication may be transmitted from the first communication device to the towing vehicle control unit in case no data is transmitted from the second communication device to the first communication device when in the power transmission connected state. A technical benefit of creating a link between the power transmission and the wireless communication is that an initiated power transmission may automatically initiate a wireless data communication check. Put differently, since the power transmission should only be possible with the communication devices within range from each other, a situation with no data being transmitted is likely to be the result of malfunction of any of the two communication devices.

In some examples, the first communication device may be complemented by an additional first communication device, and the second communication device may be complemented by an additional second communication device. An advantage with this is improved redundancy. For instance, in case the first communication device is out of function due to a hardware failure, the additional first communication device may replace the first communication device. Further, the first communication device and the additional first communication device as well as the second communication device and the additional second communication device may be arranged to operate in parallel, thereby increasing bandwidth.

According to a second aspect it is provided a towing vehicle arranged to be connected to a towed vehicle. The towing vehicle may comprise a towing vehicle control unit, a first communication device and a first power transmission device. The towing vehicle may be provided with a first power transmission device arranged to be physically connected to a second power transmission device provided in the towed vehicle. The first and second communication devices may be physically connected to the first and second power transmission devices, respectively, such that in a power transmission connected state the first and the second communication devices can be placed at a power transmission connected distance from each other, wherein the power transmission connected state can be less than a wireless communication range of the first and second communication devices. The second aspect of the disclosure may seek to solve the same problems as the first aspect, namely to reduce the risk that the communication between the towing vehicle and the towed vehicle is disrupted by e.g. a jamming device, and also that a risk of having malicious software uploaded to the towing vehicle or the towed vehicle is reduced. In line with the first aspect, a technical benefit may include that the communication devices are physically linked to the power transmission devices.

In some examples, the towing vehicle may be configured to automatically stop in case no data is transmitted from the second communication device to the first communication device if being in the power transmission connected state. A technical benefit of this is that by having the communication devices fixedly arranged to the power connection devices, the communication devices should be within range from each other in case there is power transmission. Thus, in case no data is transmitted, the likelihood of this being an effect of that the communication devices are out of range is low and thus the risk of having a malfunction of any of the two communication devices is high. Put differently, since a wireless communication failure should not be caused by that the communication devices are out of range from each other, it is likely that the communication failure is not temporally, but e.g. a hardware failure.

According to a third aspect of the disclosure it is provided a computer-implemented method for operating a system for providing communication between a towing vehicle and a towed vehicle. The system may comprise a first communication device configured to be arranged in a rear end of the towing vehicle and connected to a towing vehicle control unit. The first communication device may comprise a first transceiver for communicating with a second transceiver of a second communication device. The second communication device may be configured to be arranged in a front end of the towed vehicle and connected to a towed vehicle control unit. The second communication device may comprise the second transceiver for communicating with the first transceiver of the first communication device. The towing vehicle may be provided with a first power transmission device arranged to be physically connected to a second power transmission device provided in the towed vehicle. The first and second communication devices may physically connected to the first and second power transmission devices, respectively, such that in a power transmission connected state the first and the second communication devices can be placed at a power connected state distance from each other. The power transmission connected state distance can be less than a wireless communication range of the first and second communication devices. The method may comprise identifying that the first and second power transmission devices are in the power transmission connected state, and providing wireless communication between the first and second communication devices. The same problems may be solved and the same technical benefits may be provided as discussed above with respect to the first and second aspects.

In some examples, the method may further comprise in case no data is transmitted from the second communication device to the first communication device, transmitting a data communication failure indication to the towing vehicle control unit.

In some examples, the method may further comprise providing wired communication between first physical connectors provided on the towing vehicle and second physical connectors provided on the towed vehicle such that control data can be transmitted via wired communication from the towing vehicle control unit to the towed vehicle control unit.

As an alternative to using the physical connectors, the wired communication can be achieved by transmitting power as well as control data via the power transmission devices, e.g. by modulating the power transmission.

In some examples, the control data may pertain to towed vehicle brakes and/or towed vehicle lights.

In some examples, the control data may be transmitted via the wireless communication as well as the wired communication.

According to a fourth aspect of the disclosure it is provided a towing vehicle with a towing vehicle control unit configured to perform the method according to the third aspect.

According to a fifth aspect of the disclosure it is provided a computer program product comprising program code for performing, when executed by the system, the method according to the third aspect.

According to a sixth aspect of the disclosure it is provided a non-transitory computer-readable storage medium comprising instructions, which when executed by the system, cause the towing vehicle control unit to perform the method according to the third aspect.

According to a seventh aspect of the disclosure it is provided a method for upgrading a towing vehicle and/or a towed vehicle with a system according to the first aspect. The method may comprise mounting the first communication device in a rear end of the towing vehicle and/or the second communication device in a front end of the towed vehicle such that the first and second communication devices are placed at the power transmission connected state distance in the power connected state, and uploading instructions to the towing vehicle control unit to provide for wireless communication between the first and second communication devices upon identification of that the first and second communication devices are in the power transmission connected state. An advantage of this is that existing trucks or other towing vehicles as well as existing trailers or other towed vehicles can be retrofitted with the system according to the first aspect.

According to an eighth aspect of the disclosure it is provided a first general transmission device configured to be arranged in a rear end of the towing vehicle and connected to a towing vehicle control unit. The first general transmission device may comprise a first power transmission device arranged to be physically connected with a second power transmission device of a second general transmission device configured to be arranged in a front end of a towed vehicle in a power transmission connected state, a first communication device comprising a first transceiver for communicating with a second transceiver of a second communication device of the second general transmission device, wherein the first communication device may be physically connected to the first power transmission device such that, in the power connected state, the first and the second communication devices may be placed at a power transmission connected state distance from each other, wherein the power transmission connected state distance may be less than a wireless communication range of the first and second communication devices.

The first and second general transmission devices may be arranged to be physically connected to each other in that these are formed as a plug and socket, respectively.

In some examples, the first and the second general transmission device may together form the system according to the first aspect.

According to a ninth aspect it is provided a second general transmission device configured to be arranged in a front end of a towed vehicle and connected to a towed vehicle control unit. The second general transmission device may comprise a second power transmission device arranged to be physically connected with a first power transmission device of a first general transmission device configured to be arranged in a rear end of a towing vehicle in a power transmission connected state, a second communication device comprising a second transceiver for communicating with a first transceiver of a first communication device of the first general transmission device. The second communication device may be physically connected to the second power transmission device such that, in the power connected state, the first and the second communication devices may be placed at a power transmission connected state distance from each other, wherein the power transmission connected state distance may be less than a wireless communication range of the first and second communication devices.

In some examples, the first and the second general transmission device may together form the system according to the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The increased demand for data communication between a towing vehicle, such as a truck, and a towed vehicle, such as a trailer or a dolly, gives rise to a number of technical challenges. A first challenge is to provide sufficient bandwidth. Current communication standards between towing vehicles and towed vehicles are primarily focused on physical connectors, e.g. a plug and socket combination offering wired communication. In case, cameras or other two-dimensional sensors are to be arranged on the towed vehicle, the plug and socket combination commonly used today becomes a problem. In order to solve the bandwidth problem, it has been proposed to transmit image data and other sensor data between the towing vehicle and the towed vehicle via wireless communication. Even though the bandwidth bottleneck problem can be overcome, such approach comes with other challenges. One such challenge is how to assure that the communication is not disrupted, either by accident or willfully by using e.g. jamming devices. Another challenge is how to ensure that the data being sent between the towing vehicle and the towed vehicle is not tampered with. Even though this could be achieved by encrypting the data, the encryption comes with the costs of increased complexity, time losses and increased energy cost.

Different solutions to the above problems have been proposed. For instance, it has been suggested that communication devices can be shielded in different ways for reducing the risk of jamming. Even though many of the proposed solutions have proven useful, there is still a need for reliable and efficient data transmission technology for the specific situation with the towing vehicle and the towed vehicle.

Figure 1:
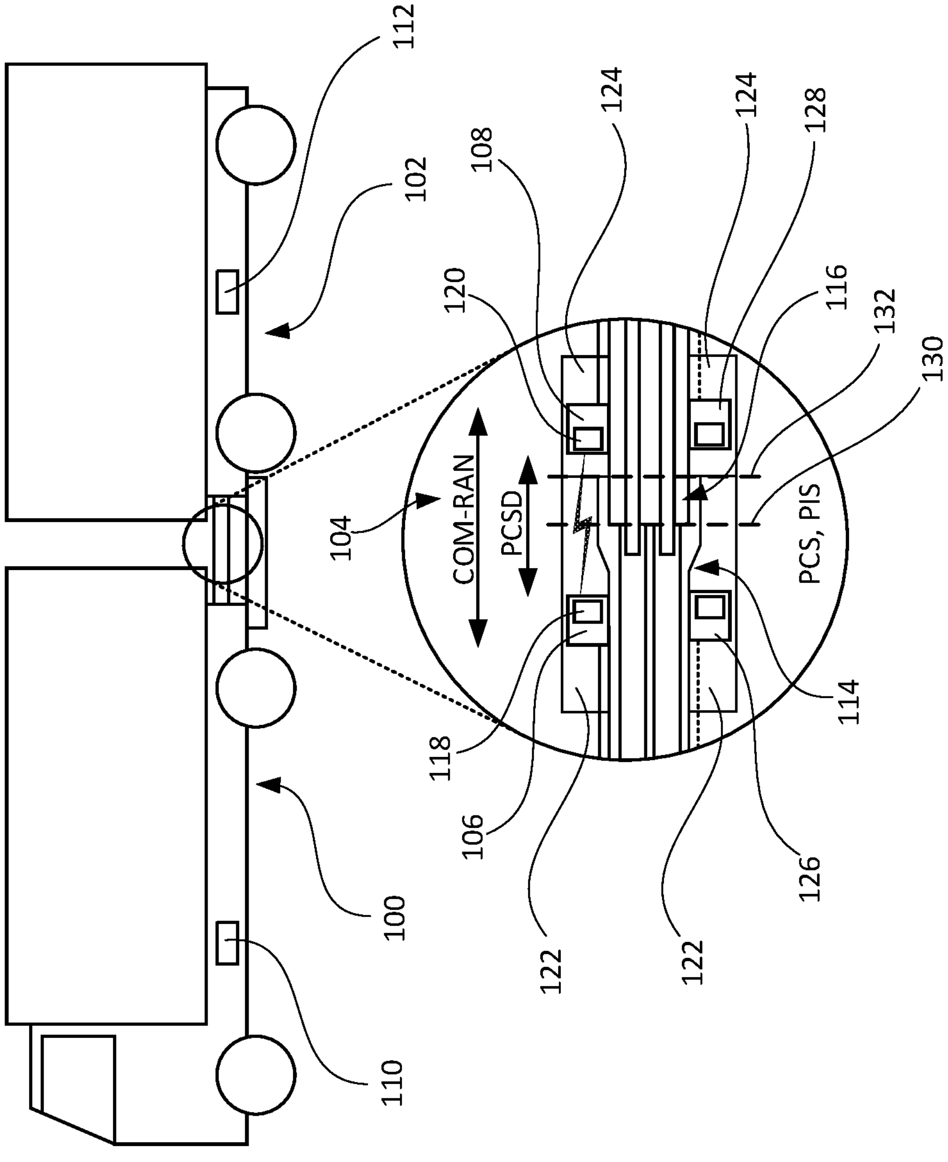
FIG. 1 is an example of a towing vehicle connected to a towed vehicle via a system for providing communication between the two according to one example.

FIG. 1 illustrates an example of a towing vehicle 100, herein illustrated as a truck, connected to a towed vehicle 102, herein illustrated as a trailer. To provide power transmission as well as data communication between the two, a system 104 is provided. The system 104 can comprise a first communication device 106 linked to the towing vehicle 100, and a second communication device 108, linked to the towed vehicle 102. The first communication device 106 can be connected via wire to a towing vehicle control unit 110. This unit may be any device configured to receive and transmit data, process data and store data. In a similar manner, the second communication device 108 may be connected to a towed vehicle control unit 112. The two control units 110, 112 may be similar devices, but they may also be different. For instance, the vehicle control unit 110 may be configured to communicate with cloud services, which may not be the case for the towed vehicle control unit 112. The towing vehicle control unit 110 and the towed vehicle control unit 112 may be equipped to process the data on their own, in combination or they may each act as a gateway and transfer the data to e.g. a remote server for having the data processed externally.

In addition to the first and second communication devices 106, 108, a first power transmission device 114, linked to the towing vehicle 100, and a second power transmission device 116, linked to the towed vehicle 102, can be provided. The first power transmission device 114 may be formed as a power outlet and the second power transmission device 116 may be formed as a power inlet such that power can be transmitted from the towing vehicle 100 to the towed vehicle 102. Put differently, electronic equipment, such as lamps, of the towed vehicle 102 may be powered by a battery held in the towing vehicle 100. The power transmission may however also be in an opposite direction, i.e. from the towed vehicle 102 to the towing vehicle 100. Powering the towing vehicle 100 via a battery held in the towed vehicle 102 may be advantageous in a situation in which the battery of the towing vehicle is low.

The first communication device 106 may be equipped with a first transceiver 118 arranged for communicating with a second transceiver 120 comprised in the second communication device 108. The first communication device 106 may be covered by a first housing 122 such that the first communication device 106 is shielded from dirt, water or other external factors. In a similar manner, a second housing 124 may cover the second communication device 108.

Since communication between the towing vehicle 100 and the towed vehicle 102 may at times be critical. For instance, in case of heavy traffic and bad weather, image data from cameras placed on the towed vehicle 102 may be crucial for making reliable decisions on lane changes or other similar situations. To reduce the risk of machine failure, an additional first communication device 126 and an additional second communication device 128 can be provided. By having a pair of first communication devices and a pair of second communication devices, a back-up can be provided in case the ordinary for one reason or the other is down. In addition to increased safety, the additional first and second communication devices 126, 128 may allow longer service intervals for the system 104.

As illustrated, in a power transmission connected state PCS the first and second communication devices 106, 108 can be placed at a power transmission connected state distance PCSD from each other. The first and second communication devices 106, 108 can be mounted with respect to the first and second power transmission devices 114, 116 such that the power transmission connected state distance PCSD is equal or less than a wireless communication range COM-RAN of the first and second communication devices 106, 108. In the power transmission connected state PCS, a PCS plane 130 may be formed between the first and second power transmission devices 114, 116.

In case the system 104 is embodied as a plug and plug socket, as illustrated, the power transmission connected state PCS may be a plugged in state PIS. In such embodiment, in the power transmission connected state PCS, coinciding with the plugged in state PIS, the PCS plane 130 may be a plane formed by a surface of the first power transmission device 114 from which pins are protruding and by a surface of the second power transmission device 116 in which slots for receiving the pins are provided. In addition to the PCS plane 130, in the plug and socket embodiment, a socket front plane 132 may be provided. The socket front plane 132 may be a plane in which a socket opening for receiving the plug is provided.

The power transmission may be made in different ways. For instance, two pins and ground may be used. The size and shape, such as cross-sectional area, of the pins may depend on the voltage applied during the power transmission. The voltages that can be applied may include 12V, 24V and 48V.

Figure 2B:
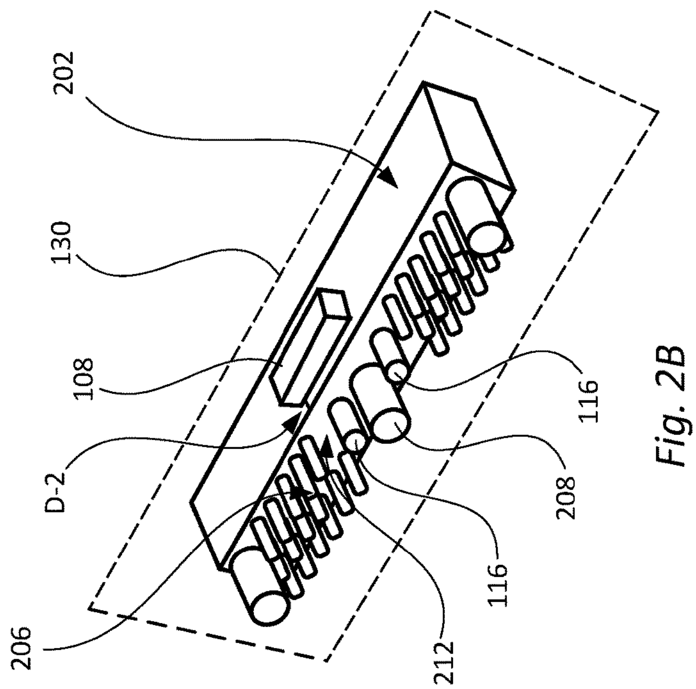
FIG. 2B is an example of a second general transmission device placed in a front end of the towed vehicle.
Figure 2A:
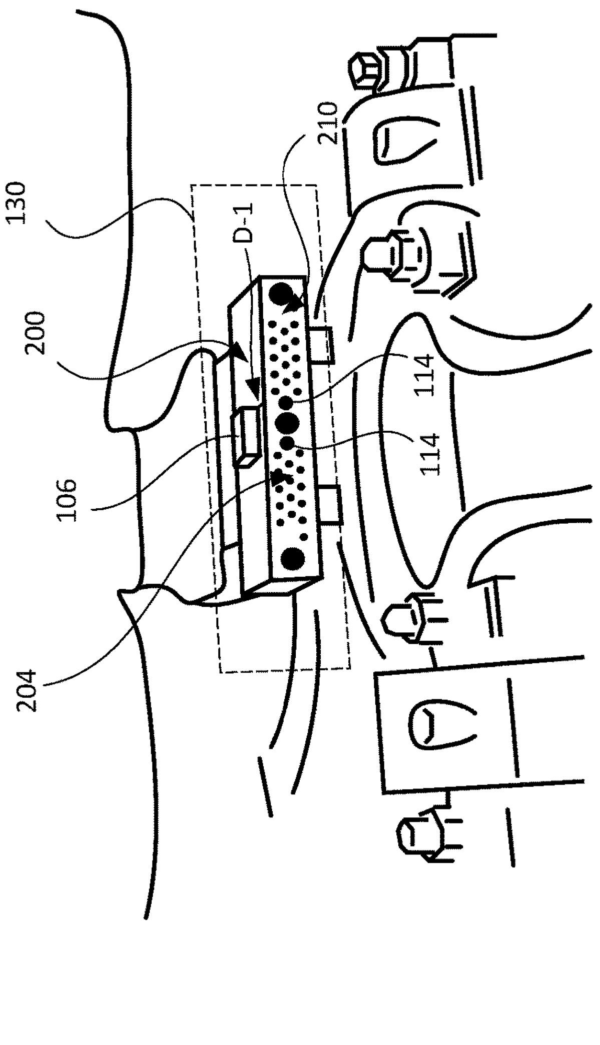
FIG. 2A is an example of a first general transmission device placed in a rear end of the towing vehicle.

FIG. 2A illustrates by way of example a first general transmission device 200 comprising the first power transmission device 114 and the first communication device 106. Even though illustrated as a device with a flat connection surface, the device may also be embodied as a socket in line with FIG. 1. In addition, even though not illustrated, a lid may be provided to cover the openings when not being in the power transmission connected state PCS.

In the example illustrated in FIG. 2A, the first power transmission device 114 is embodied as two receiving slots in a first connection surface 210. In this surface 210, first physical connectors 204 can also be provided in the form of receiving slots for pins. The physical connectors 204 may be arranged for providing wired communication for receiving and/or transmitting the control data.

In the example illustrated, the first communication device 106 can be attached to a side section of the first general transmission device 200 resulting in that the first communication device 106 is placed at a first distance D-1 from the first connection surface 210. The first distance D-1 between the first connection surface 210 and the first communication device 106 may be equal or less than the wireless communication range COM-RAN between the first and second communication devices 106, 108. In case the plug and socket embodiment is used, the first distance D-1 may instead be calculated from the socket front plane 132.

FIG. 2B illustrates by way of example a second general transmission device 202, being interrelated to the first general transmission device 200 illustrated in FIG. 2A. The second general transmission device 202 is provided with second physical connectors 206, in the form of pins, provided on a second connection surface 212. In addition to the second physical connectors 206, one or more guiding pins 208 may be provided for assuring that the first and second general transmission devices 200, 202 can be connected with low or no risk of damaging the first or second physical connectors 204, 206. In the power transmission connected state PCS, the second connection surface 212 may be placed in the PCS plane 130.

The second communication device 108 may be attached to a side section of the second general transmission device 202 such that this is placed at a second distance D-2 from the second connection surface 212. This second distance D-2 between the second connection surface 212 and the second communication device 108 may be equal or less than a wireless communication range COM-RAN between the first and second communication devices 106, 108. In case the plug and socket embodiment is used, the second distance D-2 may instead be calculated from the socket front plane 132 when the first and second general transmission devices 200, 202 are in the plugged in state PIS.

Figure 2C:
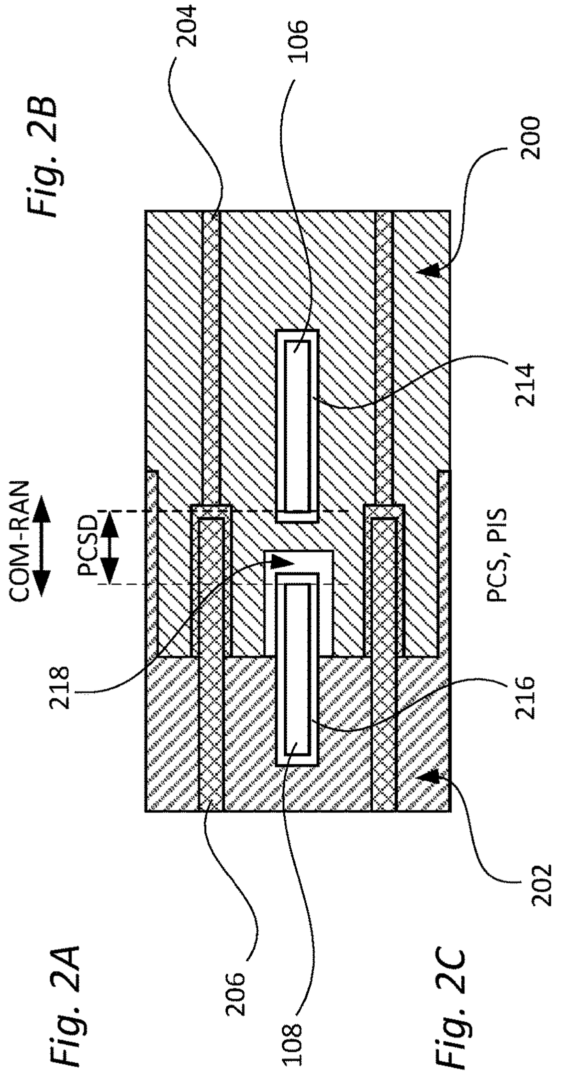
FIG. 2C is an example of a first and a second general transmission device with a void space formed between the first and second communication device in a plugged in state.

FIG. 2C illustrates another example of the first and the second general transmission devices 202, 204. Unlike the examples illustrated in FIG. 1, FIG. 2A and FIG. 2B, the first and second communication devices 106, 108 are in this example integrated into the first and second general transmission devices 202, 204, respectively, such that these are shielded. In addition to being shielded by being integrated, the first and second communication devices 106, 108 may be shielded by first and second plastic molds 214, 216, respectively. Such plastic molds can also be used in the other examples even though not illustrated.

As illustrated, in the plugged in state PIS, the first and second connectors 204, 206 can be put in physical contact such that e.g. control data and/or power can be transmitted.

To avoid the risk of damaging the first and the second communication devices 106, 108, the first and second general transmission devices 200, 202 can be designed such that in the plugged in state PIS, a void space 218 is formed between the second communication device 106 and the first general transmission device 200. By having this void space 218, the first and second communication devices 104, 106 can be integrated, and thereby protected, without risking, or at least reducing the risk, that the first or second communication devices 106, 108 are damaged during plugging or unplugging. Even though illustrated that the second communication device 106 is abutting the void space 218, it is also possible to have the first communication device 104 abutting the void space 218. Still an option is to have both the first and second communication device 106, 104 abutting the void space 218. In addition, both the first and second communication devices 106, 104 may be integrated into the first and second general transmission devices 200, 202. Even though not illustrated in FIG. 2C, one or several guiding pins 208, as illustrated in FIGS. 2A and 2B can be provided for facilitating plugging and unplugging, and thereby reducing the risk of damaging the first and second communication devices 106, 108. Even though not illustrated, both the plug and the plug socket may be provided with pins and receiving slots. Further, also not illustrated, the receiving slots may be provided with sleeve-shaped portions. The first and second communication devices 106, 108 may respectively be placed inside such sleeve-shaped portions. Connectors associated with the receiving slots may be removed and also the pins, interrelated to the receiving slots in which the first and second communication devices 106, 108 may be placed, can be removed to avoid damaging the first and second communication devices 106, 108. Thus, by having the first communication devices 106 in a sleeve-shaped portion of the plug or plug socket and the second communication device 108 in a sleeve-shaped portion of the interrelated plug socket or plug, communication between the two can be established when the plug and plug socket are in the plugged in state PIS.

Figure 3:
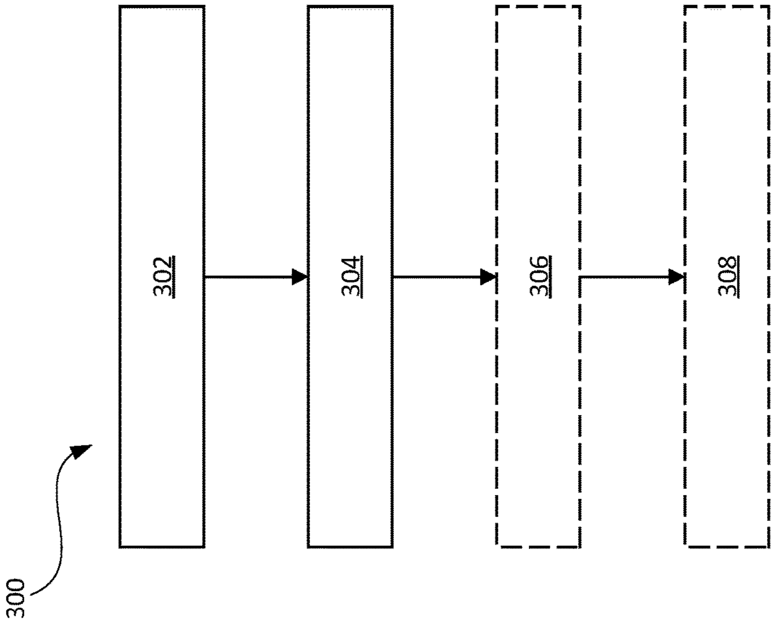
FIG. 3 is a flowchart illustrating a method for operating the system illustrated in FIG. 1.

FIG. 3 is a flowchart illustrating a method for operating the system 104 for providing communication between the towing vehicle 100 and the towed vehicle 102. The method comprises identifying 302 that the first and second power transmission devices 114, 116 are in the power transmission connected state PCS, and providing 304 wireless communication between the first and second communication devices 106, 108. Since the power transmission connected state PCS indicates that the first and second communication 106, 108 are placed within their communication range COM-RAN, the identification of power transmission may trigger the initiation, or re-initiation, of the wireless communication.

Optionally, the method may further comprise, in case no data is transmitted from the second communication device 108 to the first communication device 106, transmitting 306 a data communication failure indication to the towing vehicle control unit 110. Since the power transmission connected state PCS indicates that the first and second communication devices 106, 108 are within the communication range COM-RAN, a likelihood that failed data communication is caused by internal factors of the first and second communication devices 106, 108 may be higher compared to other solutions in which no such link between power transmission and the communication range COM-RAN is provided.

Optionally, the method may further comprise providing 308 the wired communication between the first physical connectors 204 provided on the towing vehicle 100 and the second physical connectors 206 provided on the towed vehicle 102 such that control data can be transmitted via the wired communication from the towing vehicle control unit 110 to the towed vehicle control unit 112.

Figure 4:
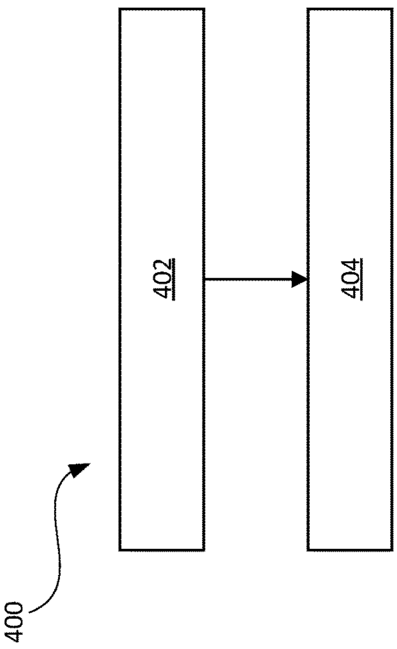
FIG. 4 is another flowchart illustrating a method for upgrading the towing vehicle and the towed vehicle with the system.

FIG. 4 is a flowchart illustrating a method for upgrading the towing vehicle 100 and/or the towed vehicle 102 with the system 104. The method 400 may comprise mounting 402 the first communication device 106 in the rear end of the towing vehicle 100 and the second communication device 108 in the front end of the towed vehicle 102 such that the first and second communication devices 106, 108 are placed at the power transmission connected state distance PCSD in the power connected state PCS, and uploading 404 instructions to the towing vehicle control unit 110 to provide for wireless communication between the first and second communication devices 106, 108 upon identification of that the first and second communication devices 106, 108 are in the power transmission connected state PCS.

Figure 5:
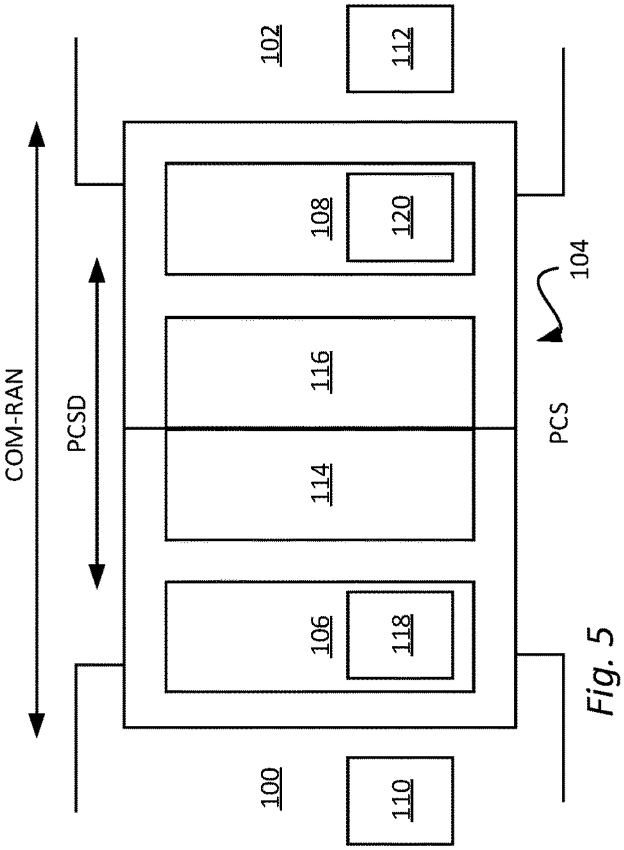
FIG. 5 is another view of FIG. 1, according to another example.

FIG. 5 is another view of FIG. 1, according to another example. In this figure it is disclosed the system 104 for providing communication between the towing vehicle 100 and the towed vehicle 102, said system 104 comprising the first communication device 106 that can be configured to be arranged in a rear end of the towing vehicle 100 and connected to a towing vehicle control unit 110, the first communication device 106 comprising the first transceiver 118 for communicating with the second transceiver 120 of the second communication device 108, and the second communication device 108 that can be configured to be arranged in the front end of the towed vehicle 102 and connected to the towed vehicle control unit 112, the second communication device 108 comprising the second transceiver 120 for communicating with the first transceiver 118 of the first communication device 106, wherein the towing vehicle 100 can be provided with the first power transmission device 114 arranged to be physically connected to the second power transmission device 116 provided in the towed vehicle 102, wherein the first and second communication devices 106, 108 can be arranged on the first and second power transmission devices 114, 116, respectively, such that in the power transmission connected state PCS the first and the second communication devices 106, 108 can be placed at the power transmission connected state distance PCSD from each other, wherein the power transmission connected state distance PCSD can be less than the wireless communication range COM-RAN between the first and second communication devices 106, 108.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A system for providing communication between a towing vehicle and a towed vehicle, said system comprising:

a first communication device configured to be arranged in a rear end of the towing vehicle and connected to a towing vehicle control unit, the first communication device comprising a first transceiver for communicating with a second transceiver of a second communication device, and the second communication device configured to be arranged in a front end of the towed vehicle and connected to a towed vehicle control unit, the second communication device comprising the second transceiver for communicating with the first transceiver of the first communication device, wherein the towing vehicle is provided with a first power transmission device arranged to be physically connected to a second power transmission device provided in the towed vehicle, wherein the first power transmission device is formed as a plug socket, and the second power transmission device is formed as a plug, or vice versa, wherein the first and second communication devices are physically connected to the first and second power transmission devices, respectively, and wherein the first communication device is arranged in a sleeve-shaped portion of the plug or plug socket and wherein the second communication device is arranged in a sleeve-shaped portion of the interrelated plug socket or plug, such that in a power transmission connected state (PCS), wherein the plug and plug socket are plugged together, communication is established between the first and the second communication devices and the first and the second communication devices are placed at a power transmission connected state distance (PCSD) from each other, wherein the power transmission connected state distance (PCSD) is less than a wireless communication range (COM-RAN) of the first and second communication devices, thereby providing for that a risk of disruption caused by external jamming devices is reduced or that a risk of having malicious software uploaded to the towing vehicle or the towed vehicle is reduced.

2. The system according to claim 1, wherein the wireless communication range (COM-RAN) is less than 1 cm in open air.

3. The system according to claim 1, wherein the first power transmission device forms part of a first general transmission device, and the second power transmission device forms part of a second general transmission device, wherein the first general transmission device further comprises first physical connectors, and the second general transmission device further comprises second physical connectors such that control data can be transmitted via wired communication from the towing vehicle control unit to the towed vehicle control unit.

4. The system according to claim 3, wherein the control data is transmitted via the wireless communication as well as the wired communication.

5. The system according to claim 1, wherein a data communication failure indication is transmitted from the first communication device to the towing vehicle control unit in case no data is transmitted from the second communication device to the first communication device when in the power transmission connected state (PCS).

6. The system according to claim 1, wherein the first communication device is complemented by an additional first communication device, and the second communication device is complemented by an additional second communication device.

7. A towing vehicle arranged to be connected to a towed vehicle, said towing vehicle comprising: a towing vehicle control unit, a first communication device and a first power transmission device, wherein the towing vehicle is provided with a first power transmission device arranged to be physically connected to a second power transmission device provided in the towed vehicle, wherein the first power transmission device is formed as a plug socket, and the second power transmission device is formed as a plug, or vice versa, wherein the first and second communication devices are physically connected to the first and second power transmission devices, respectively, and wherein the first communication device is arranged in a sleeve-shaped portion of the plug or plug socket and wherein the second communication device is arranged in a sleeve-shaped portion of the interrelated plug socket or plug, such that in a power transmission connected state (PCS), wherein the plug and plug socket are plugged together, communication is established between the first and the second communication devices and the first and the second communication devices are placed at a power transmission connected distance (PCSD) from each other, wherein the power transmission connected state distance (PCSD) is less than a wireless communication range (COM-RAN) of the first and second communication devices, thereby providing for that a risk of disruption caused by external jamming devices is reduced or that a risk of having malicious software uploaded to the towing vehicle or the towed vehicle is reduced.

8. A method for operating a system for providing communication between a towing vehicle and a towed vehicle, said system comprising a first communication device configured to be arranged in a rear end of the towing vehicle and connected to a towing vehicle control unit, the first communication device comprising a first transceiver for communicating with a second transceiver of a second communication device, the second communication device being configured to be arranged in a front end of the towed vehicle and connected to a towed vehicle control unit, the second communication device comprising the second transceiver for communicating with the first transceiver of the first communication device, wherein the towing vehicle is provided with a first power transmission device arranged to be physically connected to a second power transmission device provided in the towed vehicle, wherein the first power transmission device is formed as a plug socket, and the second power transmission device is formed as a plug, or vice versa, wherein the first and second communication devices are physically connected to the first and second power transmission devices, respectively, and wherein the first communication device is arranged in a sleeve-shaped portion of the plug or plug socket and wherein the second communication device is arranged in a sleeve-shaped portion of the interrelated plug socket or plug, such that in a power transmission connected state (PCS) the first and the second communication devices are placed at a power transmission connected state distance (PCSD) from each other, wherein the power transmission connected state distance (PCSD) is less than a wireless communication range (COM-RAN) of the first and second communication devices, said method comprising:

plugging the plug and plug socket together whereby communication is established between the first and the second communication devices, identifying that the first and second power transmission devices are in the power transmission connected state (PCS), and providing wireless communication between the first and second communication devices, thereby providing for that a risk of disruption caused by external jamming devices is reduced or that a risk of having malicious software uploaded to the towing vehicle or the towed vehicle is reduced.

9. The method according to claim 8, said method further comprising in case no data is transmitted from the second communication device to the first communication device, transmitting a data communication failure indication to the towing vehicle control unit.

10. The method according to claim 8, wherein steps of the method are embodied as a computer program product comprising program code and are performed when executed by the system.

11. The method according to claim 8, wherein steps of the method are stored in a non-transitory computer-readable storage medium comprising instructions, and when executed by the system, cause the towing vehicle control unit to perform the steps of the method.

12. The method according to claim 8, further comprising:

mounting the first communication device in a rear end of the towing vehicle and/or the second communication device in a front end of the towed vehicle such that the first and second communication devices are placed at the power transmission connected state distance (PCSD) in the power connected state (PCS), and uploading instructions to the towing vehicle control unit to provide for wireless communication between the first and second communication devices upon identification of that the first and second communication devices are in the power transmission connected state (PCS).

13. The towing vehicle of claim 7 further comprising a first general transmission device configured to be arranged in a rear end of the towing vehicle and connected to a towing vehicle control unit, said first general transmission device comprising:

a first power transmission device arranged to be physically connected with a second power transmission device of a second general transmission device configured to be arranged in a front end of a towed vehicle in a power transmission connected state (PCS), and a first communication device comprising a first transceiver for communicating with a second transceiver of a second communication device of the second general transmission device, wherein the first communication device is physically connected to the first power transmission device such that, in the power connected state (PCS), the first and the second communication devices are placed at a power transmission connected state distance (PCSD) from each other, wherein the power transmission connected state distance (PCSD) is less than a wireless communication range (COM-RAN) of the first and second communication devices.

14. The towing vehicle of claim 7 further comprising a second general transmission device configured to be arranged in a front end of a towed vehicle and connected to a towed vehicle control unit, said second general transmission device comprising:

a second power transmission device arranged to be physically connected with a first power transmission device of a first general transmission device configured to be arranged in a rear end of a towing vehicle in a power transmission connected state (PCS), and a second communication device comprising a second transceiver for communicating with a first transceiver of a first communication device of the first general transmission device, wherein the second communication device is physically connected to the second power transmission device such that, in the power connected state (PCS), the first and the second communication devices are placed at a power transmission connected state distance (PCSD) from each other, wherein the power transmission connected state distance (PCSD) is less than a wireless communication range (COM-RAN) of the first and second communication devices.

* * * * *